United States Patent Office 3,078,641
Patented Feb. 26, 1963

3,078,641
SEPARATION OF SULFUR COMPOUNDS
FROM VAPOR MIXTURES
Robert M. Milton, Buffalo, N.Y., assignor to Union
Carbide Corporation, a corporation of New York
No Drawing. Filed Dec. 31, 1959, Ser. No. 863,104
8 Claims. (Cl. 55—73)

This invention relates to a method for adsorbing fluids and separating a mixture of fluids into its component parts. More particularly, the invention relates to a method of separating hydrogen sulfide from a vapor mixture thereof with hydrogen and/or alkanes containing less than six carbons per molecule. Still more particularly, the invention relates to a method for preferentially adsorbing hydrogen sulfide from fuel gases.

This application is a continuation-in-part of copending patent application Serial No. 400,386, filed December 24, 1953, now abandoned.

Illustrating the utility of this invention, it may, for example, be desirable to remove hydrogen sulfide from fuel gases such as natural gas. Hydrogen sulfide is a common undesirable impurity in such fuels which consist primarily of alkanes and hydrogen. Such fuel gases may be "sweetened," i.e., have the undesirable hydrogen sulfide removed therefrom, by the present adsorption process.

Broadly, the invention comprises mixing molecules, in a fluid state, of the materials to be adsorbed or separated with a crystalline synthetic dehydrated zeolite X, and effecting the adsorption of the adsorbate by the zeolite.

Zeolite X, and the methods for making zeolite X, are described in detail and claimed in U.S. patent application Serial No. 400,389, filed December 24, 1953, now U.S. Patent No. 2,882,244, issued April 14, 1959, in the name of R. M. Milton.

It is the principal object of the present invention to provide a process for the selective adsorption of molecules from fluids. A further object of the invention is to provide a method whereby certain molecules may be adsorbed and separated by crystalline synthetic zeolite X from fluid mixtures of those molecules and other molecules.

The formula for zeolite X may be written as follows:

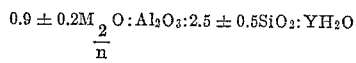

In this formula "M" represents a metal, "$n$" its valence, and "Y" may be any value up to 8 depending on the identity of the metal and the degree of hydration of the crystal. X-ray diffraction data may be employed to define the crystal structure of zeolite X. Such information and processes for synthesizing zeolite X, are provided in U.S. Patent No. 2,882,244.

The adsorbents contemplated herein include not only the sodium form of zeolite X which is a common form produced, but also crystalline materials obtained from such a zeolite by partial or complete replacement of the sodium ion with other cations. Sodium cations can be replaced, in part or entirely, by other ions. For example, this may be accomplished by ion exchange techniques.

Zeolite X exhibits adsorptive properties that are unique among known adsorbents. The common adsorbents, like chorcoal and silica gel, show adsorption selectivities based primarily on the boiling point or critical temperature of the adsorbate. Activated zeolite X, on the other hand, exhibits a selectivity based on the size and shape of the adsorbate molecule. Among those adsorbate molecules whose size and shape are such as to permit adsorption by zeolite X, a very strong preference is exhibited toward those that are polar, polarizable, and unsaturated. Another property of zeolite X that contributes to its unique position among adsorbents is that of adsorbing large quantities of adsorbate at either very low pressures, at very low partial pressures, or at very low concentrations. One or a combination of one or more of these adsorption characteristics or others can make zeolite X useful for numerous gas or liquid separation processes where adsorbents are not now employed. The use of zeolite X permits more efficient and more economical operation of numerous processes now employing other adsorbents.

Common adsorbents like silica gel and charcoal do not exhibit any appreciable molecular sieve action, whereas the various forms of zeolite X do.

In the tables which follow, the term "Weight % adsorbed" refers to the percentage increase in the weight of the adsorbent. The adsorbent was activated by heating it at a reduced pressure to remove adsorbed materials. Throughout the specification the activation temperature for zeolite X was 350° C., and the pressure at which it was heated was less than about 0.1 millimeter of mercury absolute unless otherwise specified. Likewise, the pressure given for each adsorption is the pressure of the adsorbate under the adsorption conditions unless the contrary is specified.

The present process for separating hydrogen sulfide from certain vapor mixtures depends upon the selectivity of the internal surfaces of the zeolite X crystal towards this strongly polar compound as compared with the alkanes and hydrogen. Zeolite X is capable of adsorbing all of these compounds based on a consideration of the zeolite X pore size and critical molecular dimensions of the compounds. For example, the pores of zeolite X are sufficiently large and in fact do receive methane, octane and hydrogen molecules.

Based on these considerations, one skilled in the art would logically conclude that zeolite X would not possess any particular selectivity for hydrogen sulfide in preference to the other constituents of the present vapor mixture. Contrary to these expectations, it has been discovered that zeolite X possesses an extremely strong selectivity for hydrogen sulfide to the substantial exclusion of alkanes and hydrogen. One reason for this selectivity is the highly polar nature of hydrogen sulfide as compared with the other possible constituents of the vapor mixture. Since the lower molecular weight alkanes and hydrogen are the major components of fuel gases such as natural gas, an adsorption process utilizing zeolite X as the adsorbent is quite effective for the sweetening of such fuel gases. Table I contains data showing the percent of the various gases adsorbed by zeolite X. In Table I, all of the adsorptions were carried out at 25° C.

An important characteristic of zeolite X is its property of adsorbing large amounts of adsorbates at low adsorbate pressures, partial pressures, or concentrations. This property makes zeolite X useful in the removal of adsorbable impurities from gas and liquid mixtures, since it has a relatively high adsorption capacity even when the material being adsorbed from a mixture is present in very low concentrations. Efficient recovery of minor components of mixtures is also possible. High degrees of adsorption at low pressures on zeolite X is also illustrated in Table I.

TABLE I

| Adsorbate | Adsorbent | Pressure mm. Hg | Wt. percent adsorbed |
|---|---|---|---|
| $H_2S$ | $Na_2X$ | 0.5 | 11.5 |
|  |  | 11 | 22.6 |
|  |  | 400 | 35.0 |
| $CH_4$ | $Na_2X$ | 500 | Less than 1 |
| $C_2H_6$ | $Na_2X$ | 5 | 0.2 |
|  |  | 25 | 0.8 |
|  |  | 300 | 8.3 |
|  |  | 700 | 10.2 |
| $C_3H_8$ | $Na_2X$ | 1 | 0.8 |
|  |  | 5 | 3.1 |
|  |  | 4 | 2.6 |
|  |  | 25 | 11.1 |
|  |  | 700 | 14.6 |
| $n\text{-}C_4H_{10}$ | $Na_2X$ | 700 | 17.8 |
|  |  | 710 | 17.0 |
|  |  | 729 | 17.6 |
| $i\text{-}C_4H_{10}$ | $Na_2X$ | 0.2 | 2.4 |
|  |  | 5.5 | 11.5 |
|  |  | 400 | 18.4 |
| $n\text{-}C_5H_{12}$ |  | 205 | 18.4 |
|  |  | 224 | 19.3 |
| $n\text{-}C_6H_{14}$ | $Na_2X$ | 0.18 | 4.8 |
|  |  | 0.22 | 10.2 |
|  |  | 20 | 19.2 |
|  | $MgX$ | 20 | 18.3 |
|  | $BaX$ | 20 | 15.8 |
|  | $MnX$ | 20 | 17.9 |
|  | $Li_2X$ | 20 | 19.2 |
|  | $Ce_2X_3$ | 20 | 16.1 |
| $n\text{-}C_8H_{18}$ | $Na_2X$ | 11.0 | 30 |
|  |  | 2.3 | 20.8 |
|  |  | 5.0 | 20.8 |
|  |  | 2.3 | 14.2 |
|  |  | 5.0 | 14.2 |

An advantage that may be taken of this high adsorption capacity at low pressures is the operation of adsorption processes at higher temperatures than are normally used with common adsorbents. The adsorption power of physical adsorbents usually decreases with increasing temperature, and therefore while the adsorption capacity of many adsorbents in a certain separation may be sufficient if operated at one temperature, the capacity may not be sufficient to make operation feasible at a higher temperature. With strongly adsorbing zeolite X, however, substantial capacity is retained at higher temperatures. The present separation is preferably effected at a temperature below 973° K., since the crystal structure of zeolite X will be disrupted or damaged with consequent loss of adsorption capacity and reduction in pore size. For maximum efficiency this adsorption process is performed at temperatures less than 616° K. but higher than 283° K. This is for the reason that above such range, the hydrocarbon constituents of the vapor feed stream in contact with zeolite X will tend to isomerize, hydrogenate, aromatize and polymerize, all of which will clog the pores and cause loss of capacity of zeolite X molecular sieve. Also, to employ adsorption temperatures below about 283° K., a refrigerating system would be required which increases the complexity and expense of operation.

*Example I*

A mixture of propane containing about 0.1 mole fraction of hydrogen sulfide is passed through a bed of dehydrated zeolite X. The flow is stopped as soon as hydrogen sulfide is detected in the effluent. At this point, the effluent is substantially free of hydrogen sulfide contamination. If large amounts are tolerable, the adsorption can be continued until the hydrogen sulfide level reaches the predetermined value.

*Example II*

Natural gas, containing principally methane, ethane, propane, hydrogen and lesser amounts of the butanes, pentanes and hexanes, together with sulfur impurities, chiefly hydrogen sulfide and the lower boiling mercaptans, particularly methyl mercaptan, is passed through a bed of dehydrated sodium zeolite X. The effluent is substantially depleted in hydrogen sulfide and the mercaptans. If the process is stopped as soon as sulfur compounds are detected in the effluent, the effluent will be almost completely free of contamination.

Zeolite X may be used as an adsorbent for the purposes indicated above in any suitable form. For example, a column of powdered crystalline material has given excellent results as has a pelleted form obtained by pressing into pellets a mixture of zeolite X and a suitable binding agent such as clay.

What is claimed is:

1. A process for the separation of hydrogen sulfide from a vapor mixture thereof with at least one gas selected from the group consisting of hydrogen and alkanes containing less than six carbon atoms which comprises intimately contacting said vapor mixture with crystalline, synthetic, at least partially dehydrated zeolite X whereby said hydrogen sulfide is preferentially adsorbed from said mixture, and separating the hydrogen sulfide-depleted vapor mixture from said zeolite X.

2. A process in accordance with claim 1 wherein said zeolite X is sodium zeolite X.

3. A process according to claim 1 in which said vapor mixture contains hydrogen sulfide and methane.

4. A process according to claim 1 in which said vapor mixture contains hydrogen sulfide and ethane.

5. A process according to claim 1 in which said vapor mixture contains hydrogen sulfide and propane.

6. A process according to claim 1 in which said vapor mixture contains hydrogen sulfide and butane.

7. A process according to claim 1 in which said vapor mixture contains hydrogen sulfide and pentane.

8. A process according to claim 1 in which said vapor mixture contains hydrogen sulfide and hydrogen.

References Cited in the file of this patent

UNITED STATES PATENTS 2,270,058    Jones _____ Jan. 13, 1942
2,882,244    Milton _____ Apr. 14, 1959

OTHER REFERENCES

Separation of Mixtures Using Zeolites as Molecular Sieves, Parts I, II, III, Barrer, J. Soc. Chem. Ind., vol. 64, May 1945, pages 130–135.

Molecular-Sieve Action of Solids, Barrer, Quarterly Review (1949), Chem. Society, London, pages 293–320.

Crystalline Zeolites, I, The Properties of a New Synthetic Zeolite, Type A. Breck et al., J.A.C.S., vol. 78, No. 23, Dec. 8, 1956, pages 5963–5971.

Examine These Ways To Use Selective Adsorption, Linde Co., Petroleum Refiner, vol. 36, No. 7, July 1957, pages 136–140.